US012667878B2

(12) United States Patent
Emmons et al.

(10) Patent No.: US 12,667,878 B2
(45) Date of Patent: Jun. 30, 2026

(54) DIGITAL ROLL GAP VERIFICATION TOOL AND RELATED CALIBRATION STAND

(71) Applicant: Cleveland-Cliffs Steel Properties Inc., West Chester, OH (US)

(72) Inventors: Zachary Duwayne Emmons, Evansville, IN (US); Mark Anthony Harmon, Calhoun, KY (US); Jeffrey Michael Collins, Evanston, IN (US)

(73) Assignee: Cleveland-Cliffs Steel Properties Inc., Cleveland, OH (US)

( * ) Notice: Subject to any disclaimer, the term of this patent is extended or adjusted under 35 U.S.C. 154(b) by 751 days.

(21) Appl. No.: 17/964,334

(22) Filed: Oct. 12, 2022

(65) Prior Publication Data

US 2023/0110043 A1 Apr. 13, 2023

Related U.S. Application Data

(60) Provisional application No. 63/255,161, filed on Oct. 13, 2021.

(51) Int. Cl.
*B21B 38/10* (2006.01)
*B21D 1/06* (2006.01)
*G01B 11/14* (2006.01)
(52) U.S. Cl.
CPC .............. *B21B 38/10* (2013.01); *B21D 1/06* (2013.01); *G01B 11/14* (2013.01)
(58) Field of Classification Search
CPC .. B21B 38/10; B21D 1/06; B21D 1/02; G01B 11/14; G01B 5/14
See application file for complete search history.

(56) References Cited

U.S. PATENT DOCUMENTS

| | | | | |
|---|---|---|---|---|
| 1,692,014 A | * | 11/1928 | Winn | G01B 3/166 |
| | | | | 33/657 |
| 2,439,363 A | * | 4/1948 | Habicht | G01B 3/30 |
| | | | | 33/562 |
| 2,573,075 A | * | 10/1951 | Shonk | G01B 5/12 |
| | | | | 33/501.4 |
| 2,651,112 A | * | 9/1953 | Duclos | A61B 5/107 |
| | | | | 33/797 |

(Continued)

FOREIGN PATENT DOCUMENTS

| | | |
|---|---|---|
| CA | 1136848 | 12/1982 |
| DE | 4122642 A1 | 2/1992 |

OTHER PUBLICATIONS

International Search Report and Written Opinion dated Jan. 25, 23 for Application No. PCT/US2022/046424, 9 pages.

*Primary Examiner* — Kristina M Deherrera
*Assistant Examiner* — Tania Courson
(74) *Attorney, Agent, or Firm* — FBT Gibbons LLP

(57) ABSTRACT

A gap verification tool is usable with a leveling unit where the leveling unit includes multiple offset rollers that flatten a material, such as a previously coiled steel sheet, as it passes through the leveling unit. The gap verification tool includes a sensing assembly that has blades that rotate about a pivot point of the tool. An encoder of the tool measures the rotation of the blades and determines a gap between the offset rollers. A calibration stand is also usable with the tool to calibrate the tool. The calibration stand includes offset rollers setup with a known gap.

10 Claims, 9 Drawing Sheets

(56)                    References Cited

U.S. PATENT DOCUMENTS

| | | | | |
|---|---|---|---|---|
| 2,802,273 A * | 8/1957 | Mueller | .................. | G01B 5/12 |
| | | | | 33/501.5 |
| 3,947,970 A * | 4/1976 | Lesure | .................... | G01C 9/28 |
| | | | | 33/657 |
| 4,044,580 A * | 8/1977 | Worden | .................. | G01B 7/14 |
| | | | | 33/657 |
| 4,067,115 A * | 1/1978 | Beaton | ................. | B21B 39/165 |
| | | | | 33/657 |
| 4,186,579 A | 2/1980 | Eibe | | |
| 4,442,606 A | 4/1984 | Graham et al. | | |
| 4,610,090 A * | 9/1986 | Brady | .................... | G01B 5/02 |
| | | | | 33/797 |
| 5,979,069 A * | 11/1999 | Hayashida | .......... | G01D 5/2415 |
| | | | | 33/832 |
| 6,993,947 B2 | 2/2006 | Tondo et al. | | |
| 7,216,441 B2 * | 5/2007 | Batora | .................. | G01B 3/205 |
| | | | | 33/613 |
| 7,262,614 B1 * | 8/2007 | Campbell | ......... | G01R 1/06788 |
| | | | | 324/755.05 |
| 7,475,581 B2 | 1/2009 | Farnik | | |
| 7,903,991 B2 * | 3/2011 | Monahan | .......... | G03G 15/2064 |
| | | | | 399/328 |
| 10,378,873 B2 | 8/2019 | Cox, III et al. | | |

* cited by examiner

DIGITAL ROLL GAP VERIFICATION TOOL AND RELATED CALIBRATION STAND

PRIORITY

This application claims priority to U.S. Provisional Patent Application Ser. No. 63/255,161, filed Oct. 13, 2021, entitled "Digital Roll Gap Verification Tool and Related Calibration Stand," the disclosure of which is incorporated by reference herein.

BACKGROUND

A leveling unit is typically positioned on an entry end of a steel-making line for removing curl from a head end and/or a tail end of steel strips entering the line that have been coiled. These units are generally comprised of seven work rolls, including four bottom rollers positioned on a bottom surface of the strip and three top rollers positioned on a top surface of the strip that are staggered relative to the bottom rollers. These units may further include a roll-gap adjustment apparatus to vary a roll gap between the top rollers and the bottom rollers to yield a flat strip on its output end. The rollers are typically adjustable at the entry end of the unit and the exit end of the unit. To do this, the roll gap is generally within about 0.020 inches (0.51 millimeters) of a gap set-point. Failure to achieve this setpoint within the tolerance may result in a strip that is not sufficiently flat and is prone to damaging and/or hanging on downstream equipment, as well as causing rewelds to the strip. Accordingly, verification of the roll-gap adjustment apparatus is needed from time to time, such as when the rollers and/or other components of the leveling unit are serviced and/or replaced.

While a variety of tools or instruments have been made and used to measure and/or verify roll-gap as described above, it is believed that no one prior to the inventor(s) has made or used an invention as described herein.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

Figure 1:
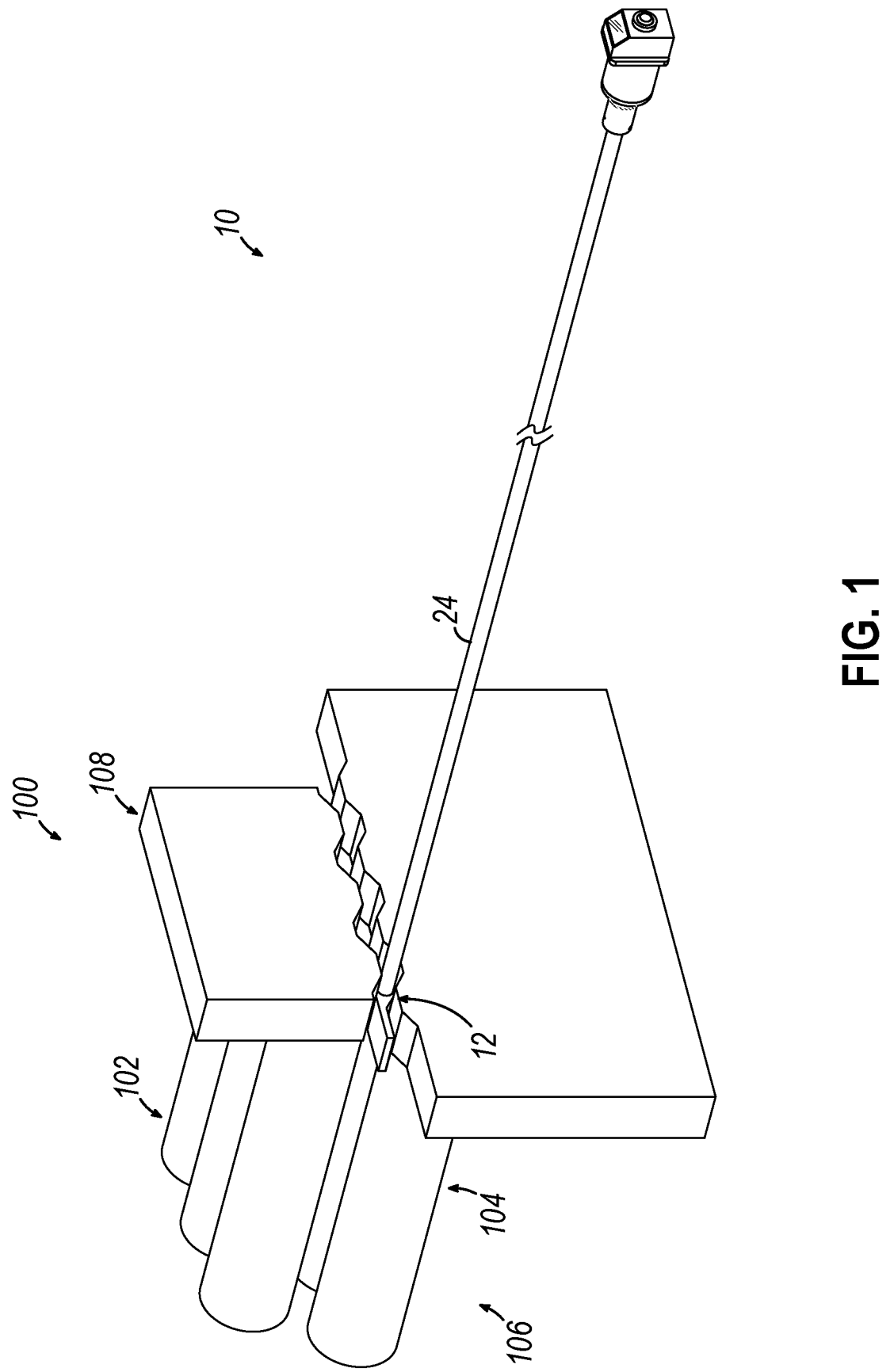
FIG. 1 depicts a perspective view of an exemplary gap verification tool being used with a leveling unit.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description. As will be realized, the invention is capable of other different and obvious aspects, all without departing from the invention. Accordingly, the drawings and descriptions should be regarded as illustrative in nature and not restrictive.

I. Problem Solved by Invention

A typical gap verification method is that of a "feeler gauge" type of verification. In this verification, a user may be staged at the leveling unit with an about 0.5 inch (12.7 millimeter) thick piece of flat metal and/or any other suitable flat surface to serve as a feeler gauge. The user may slide the gauge through the rollers and manually convey commands to increase and/or decrease the roll gap between the rollers based on a drag of the feeler gauge translating between the rollers. When the user manually detects or "feels" an ideal amount of drag on the feeler gauge between the rollers, the user may determine that the leveling unit has been calibrated.

The problem with this procedure is that detecting a sufficient amount of drag with the feeler gauge between the rollers may be difficult and may vary from user to user. For instance, various users may have different perceptions of a sufficient drag of the feeler gauge, which may result in inconsistent gap determinations. Also, in some instances, adjusting the unit on one end, such as the exit end, may impact the opposite end, such as the entry end, due to the configuration of the roll-gap adjustment apparatus. This may cause one end of the unit to be out of alignment. Another problem with this method is that the roll gap may be adjusted too tightly when the feeler gauge is in place between the rollers, which may deform the feeler gauge and cause errors during verification. Therefore, what is needed is a gap verification tool and method that overcomes the above-mentioned problems with the "feeler gauge" approach.

II. Exemplary Gap Verification Tool

Figure 4:
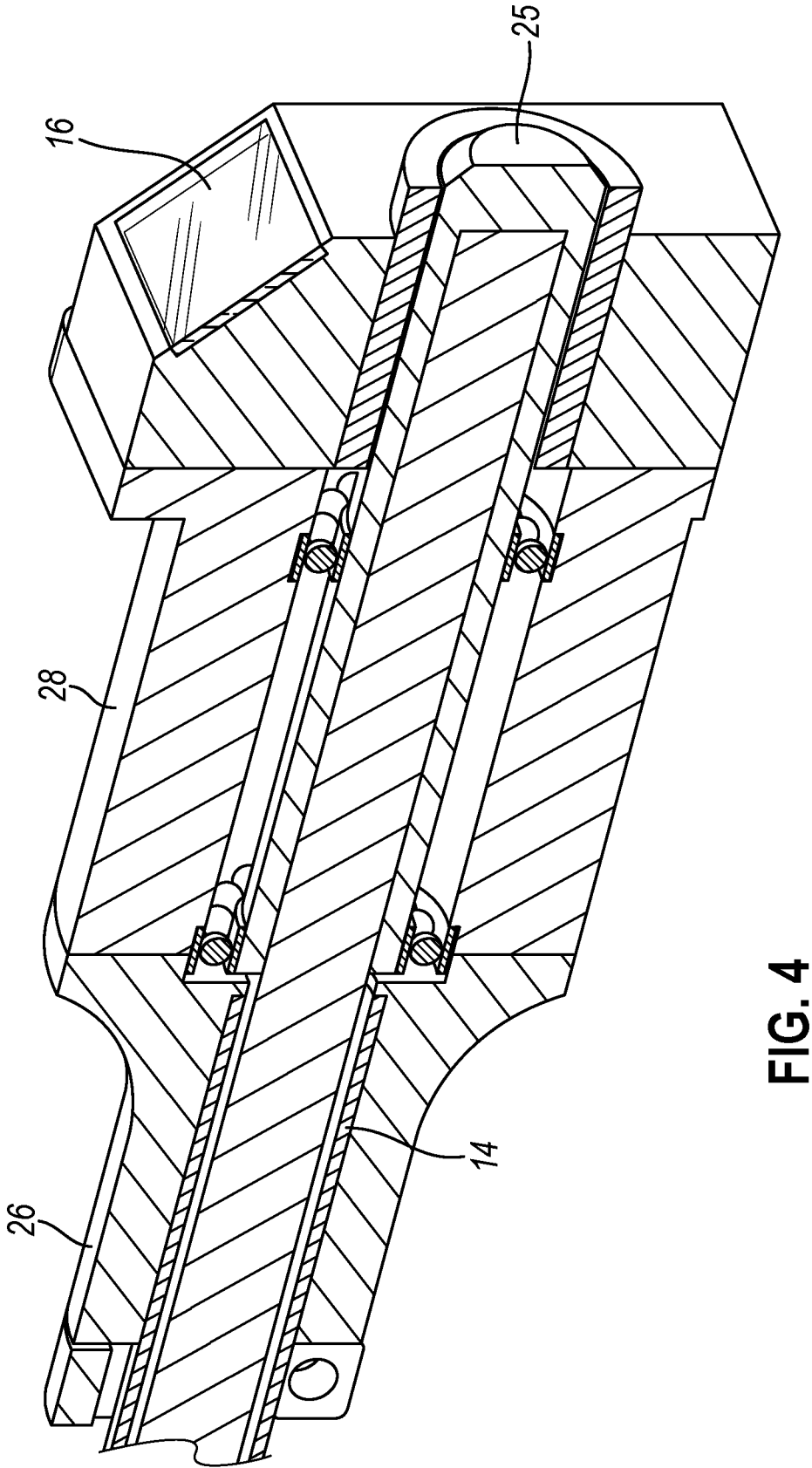
FIG. 4 depicts a perspective view of the proximal end of the gap verification tool in cross section showing an included encoder.
Figure 5:
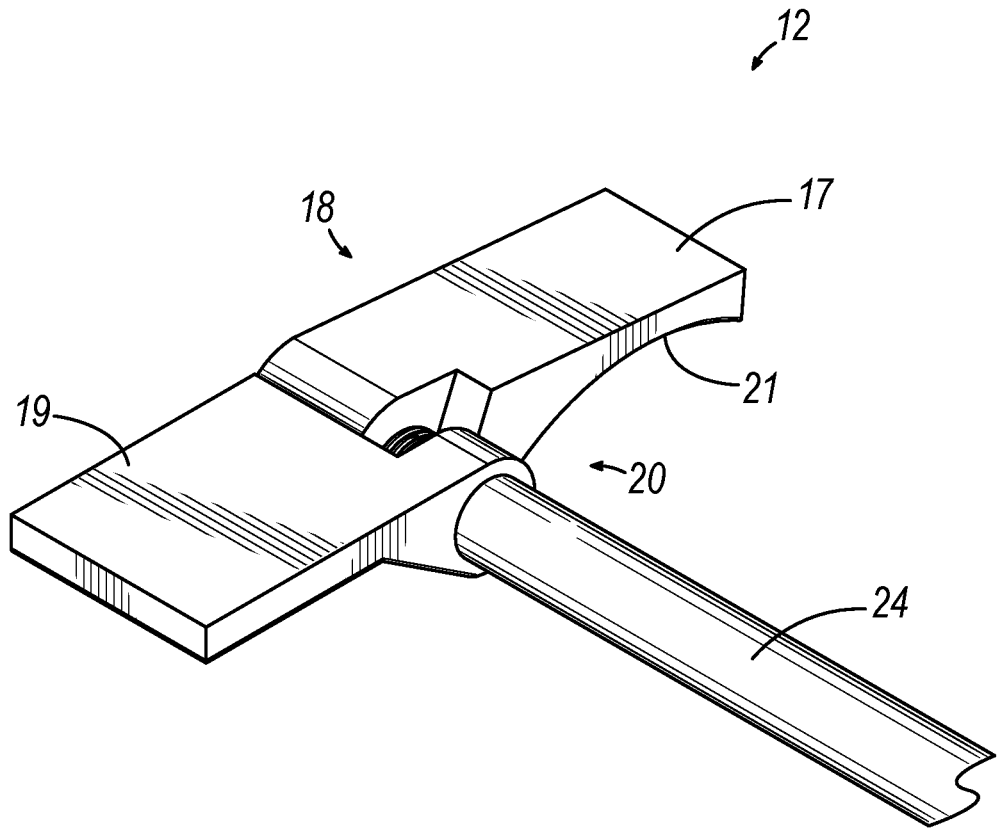
FIG. 5 depicts a partial perspective view of the distal end of the gap verification tool, showing a sensing assembly.
Figure 6:
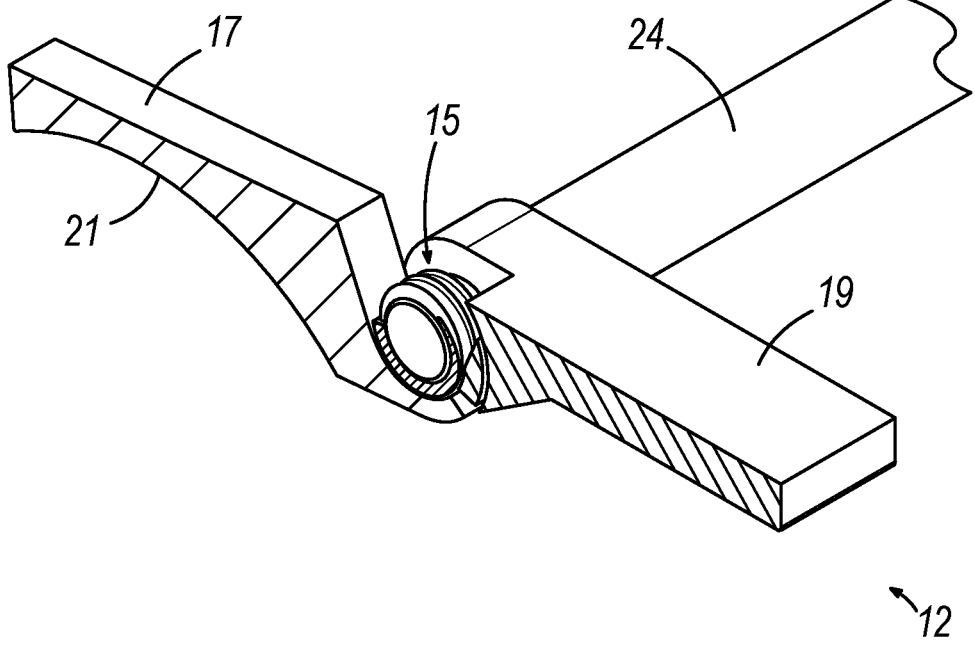
FIG. 6 depicts a perspective view of the sensing assembly in cross section.

FIG. 1 illustrates a gap verification tool (10) being used with an exemplary leveling unit or leveling assembly (100) having one or more upper or top rollers (102) and one or more lower or bottom rollers (104). As shown in FIGS. 5 and 6, the gap verification tool (10) comprises a scissor-type sensing assembly (12) that is coupled to a rotary encoder (14) with an on-board digital readout or display (16) as shown in FIG. 4. Rotary encoders are well-known in the art. The scissor-type sensing assembly (12) comprises a pair of blades (18) that are rotatable relative to each other about a pivot point (20). In some versions both blades (18) are rotatable while in other versions one blade (18) is fixed and the other blade (18) rotatable. As shown in FIG. 6, the sensing assembly (12) includes a biasing feature (15) where the blades (18) are biased to an initial position yet one or more of the blades (18) may rotate about the pivot point (20) as mentioned. In the illustrated version, the biasing feature (15) comprises a spring. This biasing feature (15) is in communication with the encoder (14) such that a rotational position of the blades (18) causes corresponding movement of the biasing feature (15) and this is communicated to the encoder (14) and ultimately displayed on the digital readout (16) as will be appreciated by those of ordinary skill in the art of encoders in view of the teachings herein.

In use, the blades (18) of the sensing assembly (12) may be positioned between a top roller (102) and a bottom roller (104) of the leveling unit (100) where the roller assembly of the leveling unit (100) has been opened such that the blades (18) can be located between the rollers as mentioned. In one example one or more tools (10) are used at an entry end (106) and/or exit end (108) of the leveling unit (100). With the one or more blades (18) of the sensing assembly (12) between the rollers, the roller assembly of the leveling unit (100) are lowered and the rollers contact or abut the blades (18) such that one or more of the blades (18) rotate. The encoder (14) detects the rotation of the one or more blades (18) and provides a display of the rotation on the digital readout (16). The digital readout (16) may further equate the degrees of rotation between each blade (18) of the sensing assembly (12) to a roll gap between the top and bottom roller (102, 104) of the unit (100) and display that roll gap distance on the digital readout (16). The encoder (14) and digital readout (16) may be set to detect about 0.001 inch (0.0254 millimeter) increments of gap change. This results in a more consistent and/or precise calibration of the leveling unit (100) between users. A level (22) may be included on the tool (10) so that the tool (10) can be held level during verification. Once the desired roll gap is achieved as indicated on the tool (10), the adjustment of the roller assembly of the leveling unit (100) is stopped such that the leveling unit (100) is now set to the desired roll gap. The tool (10) is thereafter removed from the leveling unit (100).

Figure 2:
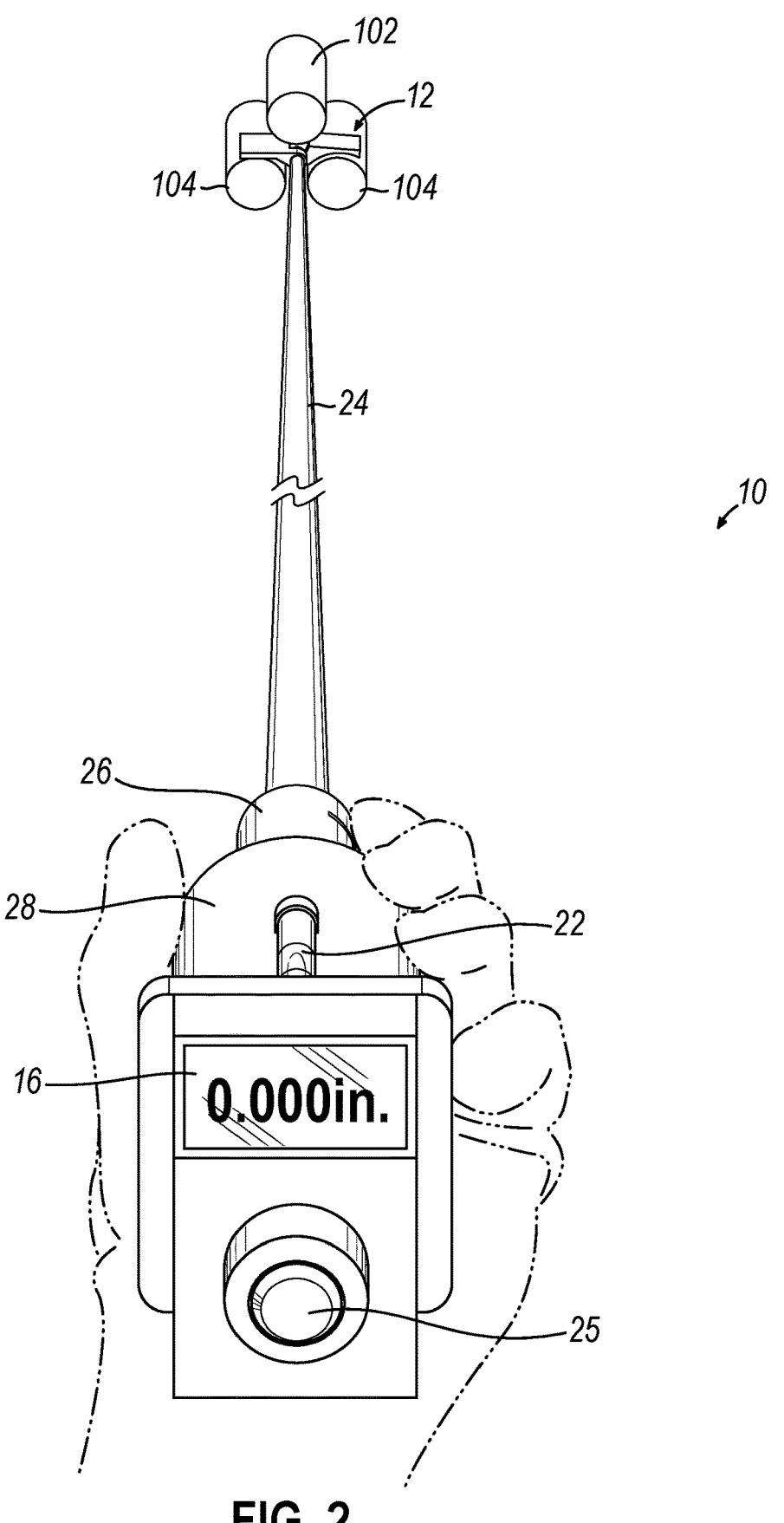
FIG. 2 depicts another perspective view of the gap verification tool of FIG. 1, shown from a proximal end toward a distal end.
Figure 3:
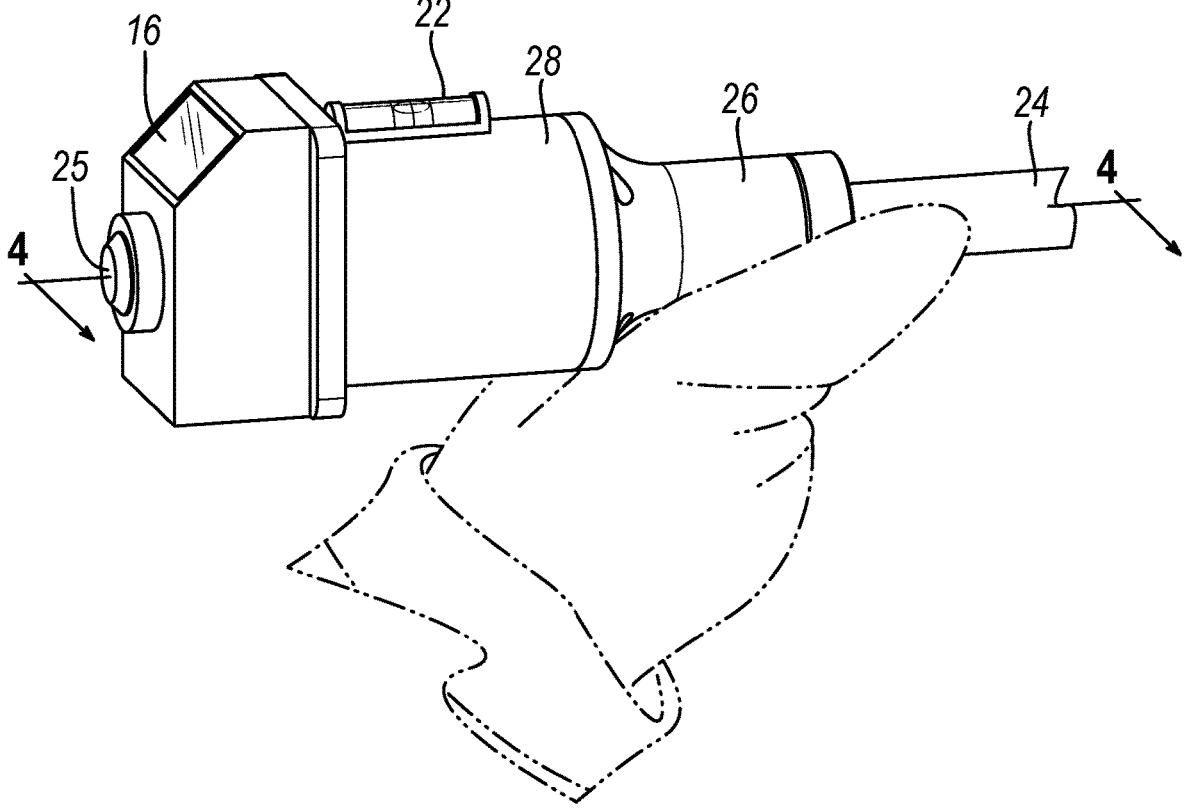
FIG. 3 depicts a partial perspective view of the proximal end of the gap verification tool, showing a display.

In one embodiment, a first blade (17) and a second blade (19) are attached to the distal end of a shaft (24) with the first blade (17) and the second blade (19) defining the pair of blades (18). In some embodiments, the first blade (17) is arcuate on its underside such that it contacts more than merely a tangent point on a corresponding roller (102, 104), thereby providing a reference surface (21). In such embodiments, the second blade (19) is flat, such that it contacts a tangent point on a second corresponding roller (102, 104). Referring to FIGS. 2-4, on the proximal end of the shaft (24), a rotary encoder (14) is housed within a pipe hub (26), which is affixed to a bearing housing (28). A level (22) is also affixed to the proximal end of the shaft on the exterior of the bearing housing (28) as shown in FIGS. 2 and 3. As also shown in FIGS. 1-4, a shaft adapter (25) is located within the bearing housing (28) and extends through the housing for the digital readout (16). The shaft adapter (25) retains the shaft (24) within the pipe hub (26) and bearing housing (28) of the tool (10).

In one exemplary application, to verify the proper gap between offset rollers (102, 104), a pair of gap verification tools (10) are installed in multi-roll unit, such as a leveling unit (100). The two gap verification tools (10) are installed, one at the entry side of the unit (106), and one at the exit side of the unit (108). The operator at the unit is able to take a numerical reading of both ends of the leveling unit (100), as adjustment at one end can influence the opposite end. This tool eliminates the need to try to judge gap size subjectively (such as by a "feeling" of drag). The number displayed on the encoder is the objective gap distance between the rolls. The tool is also constructed in a manner where the roll gap can be "over-shot" significantly so that it is too tight without damaging the unit. For instance, in one version it is possible to use the tool (10) even when there is no roll gap such that the display (16) shows a roll gap of 0.00 inches (0.00 millimeters).

III. Exemplary Calibration Stand

Figure 7:
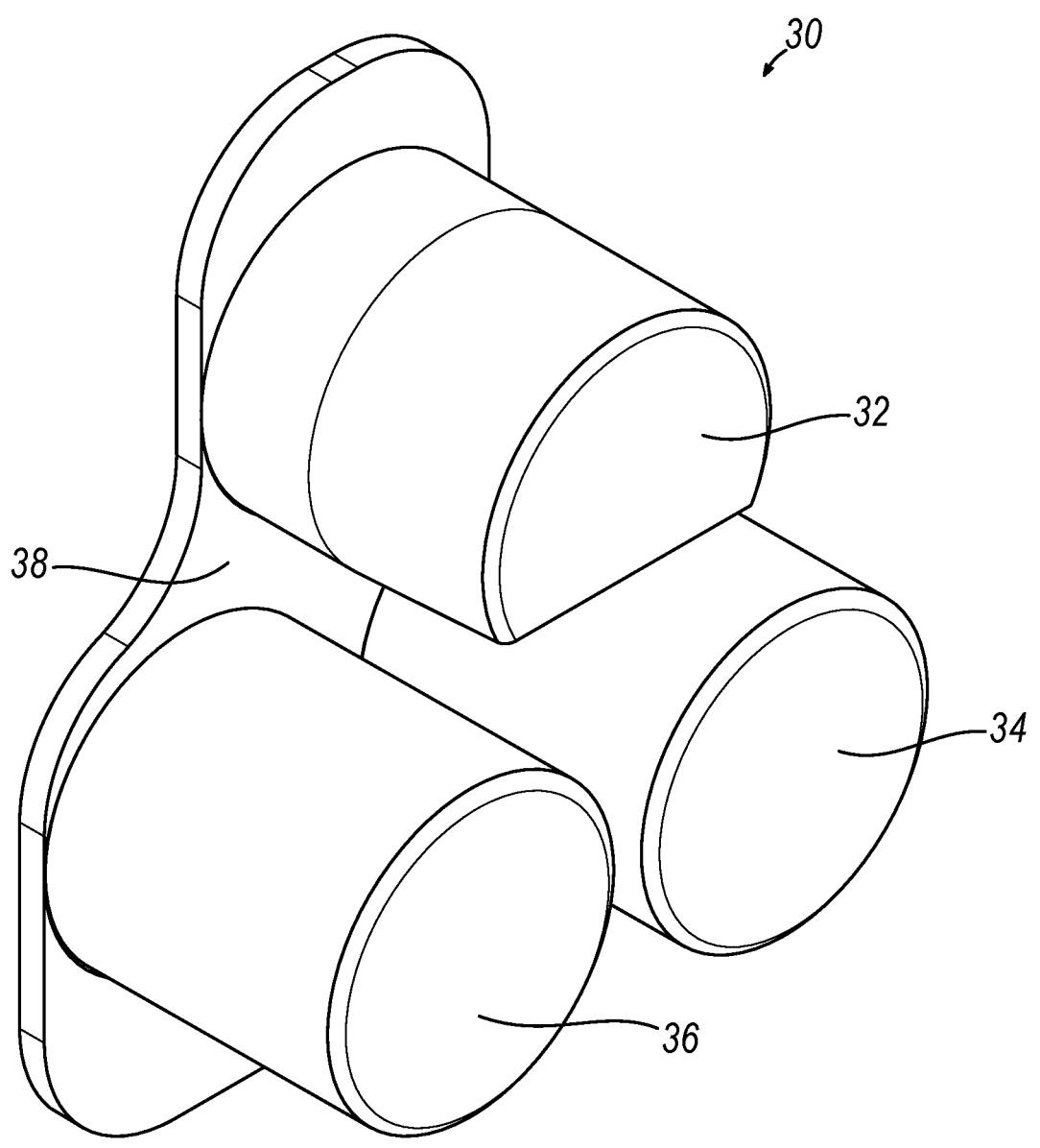
FIG. 7 depicts a perspective view of an exemplary calibration stand usable with the gap verification tool of FIG. 1.
Figure 8:
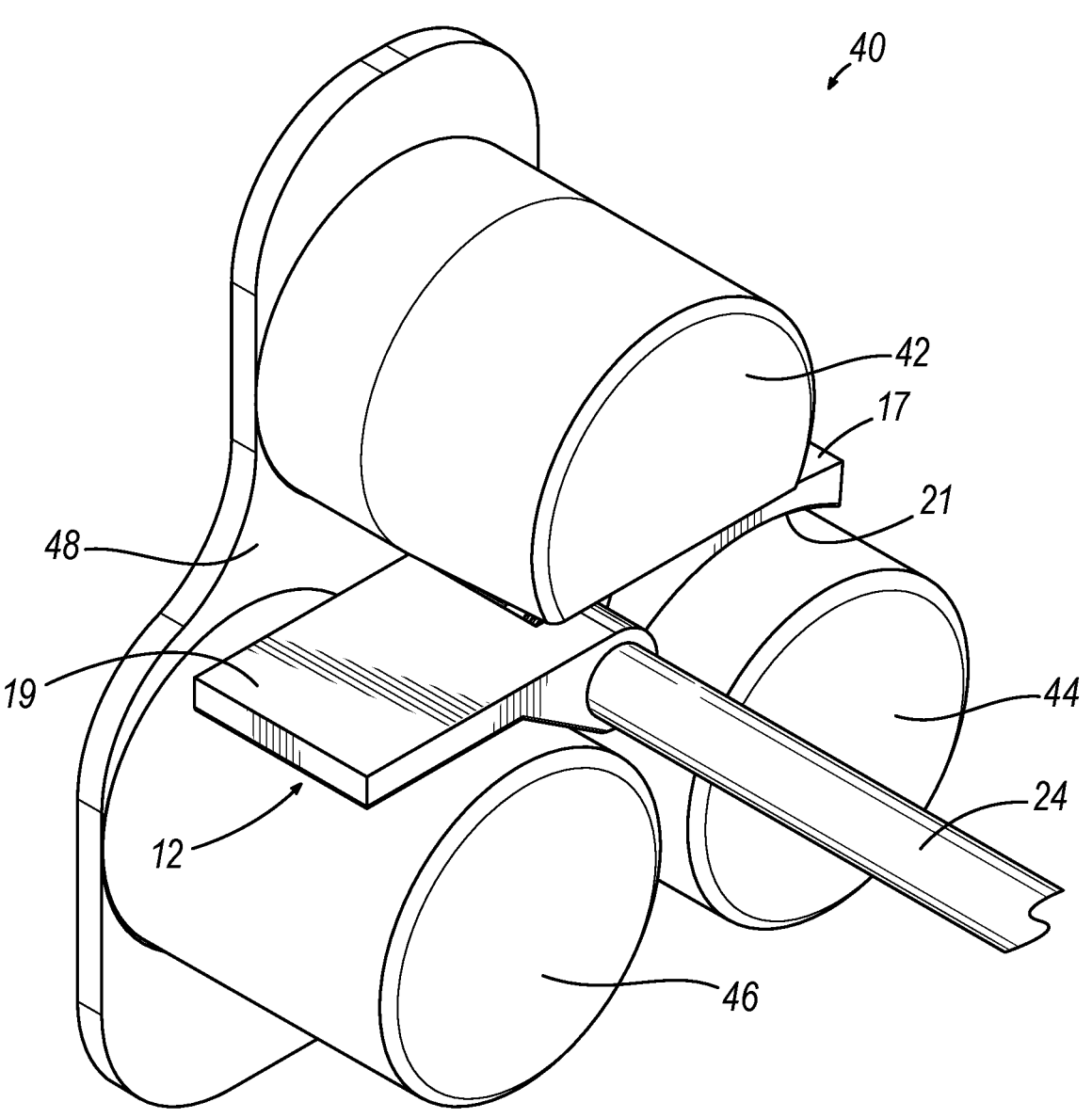
FIG. 8 depicts a perspective view of another exemplary calibration stand, showing the sensing assembly of the gap verification tool being used with the calibration stand in a calibration process.
Figure 9:
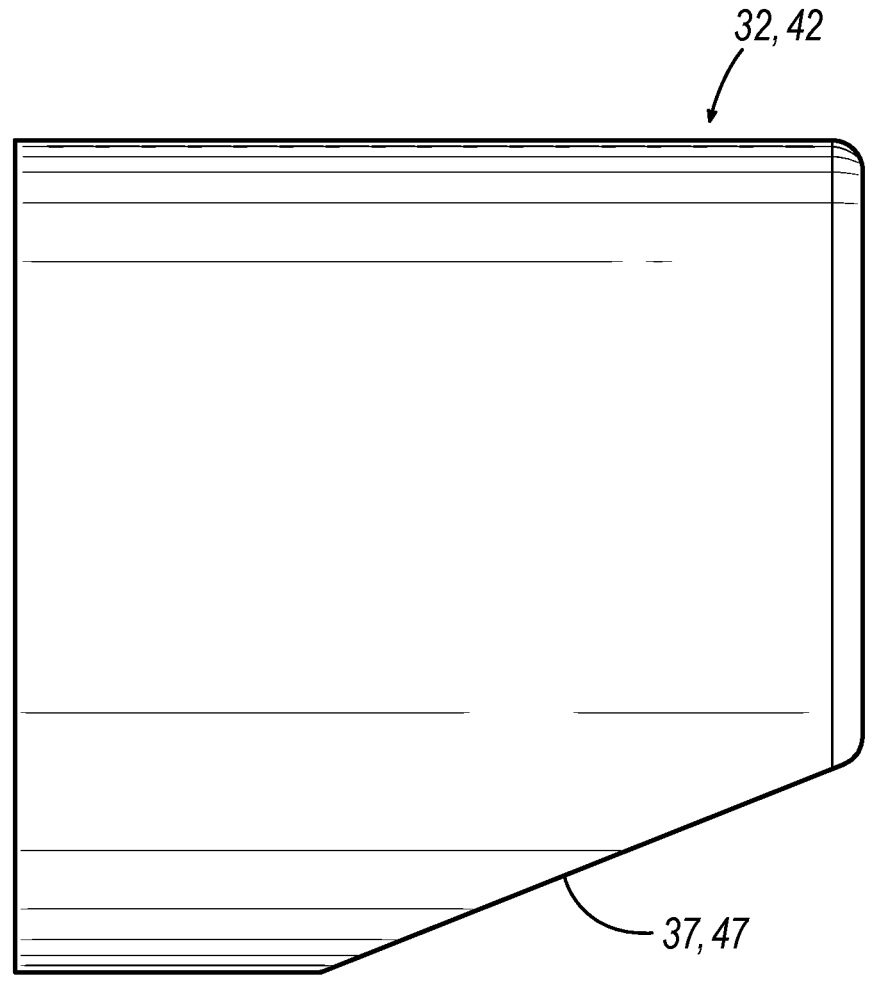
FIG. 9 depicts a side view of an exemplary top roller of the calibration stands of FIGS. 7 and 8.

The gap verification tool (10) may be calibrated on a calibration stand (30, 40) that includes partial roller simulators (32, 34, 36, 42, 44, 46) to mimic the dimensions of the rollers (102, 104) in a relevant production leveling unit (100). Referring to FIGS. 7 and 8, three partial roller simulators (32, 34, 36, 42, 44, 46), e.g., one top roller and two bottom rollers, are affixed to a stand (38, 48) of respective calibration stands (30, 40) in the offset arrangement of the production leveling unit (100). The lower portion of the top partial roller may be beveled with a beveled surface (37, 47) to provide ease of insertion of the gap verification tool (10) into the calibration stand (30, 40), as shown in FIG. 9.

As one example, calibration stands (30, 40) may include one set of partial roller simulators (32, 34, 36) with an about 0.5 inch (12.7 millimeter) gap between a top roller and the bottom rollers, and a second set of partial roller simulators (42, 44, 46) with an about 0.25 inch (6.35 millimeter) gap between a top roller and the bottom rollers. In some versions calibration stands (30, 40) are combined into a single calibration stand with multiple sets of partial roller simulators. For instance, stands (38, 48) may be combined in such versions. In either approach for the calibration stands, an operator performing the calibration of the gap verification tool (10) inserts the tool (10) into the first set of partial roller simulators (32, 34, 36) to confirm the device reads "0.500+/−0.002" when inserted into the 0.5 inch (12.7 millimeter) gap stand. The operator then verifies the incremental span calibration of the device by inserting the device into the second set of partial roller simulators having a 0.25 inch (6.35 millimeter) gap and verifying the device reports a "−0.250+/−0.002" reading.

Such gap verification tools, and related calibration stands, may also be used to calibrate other production units comprising offset rollers having a specified gap between the rollers, including stretch levelers, tension levelers, bending units, and the like. Furthermore, the gap verification tool described herein can be battery powered where the tool includes a disposable or rechargeable battery as well as the power transmission wiring associated to power the tool. The tool can also include other wiring and electronic components, for example a printed circuit board with a memory and processor, that are configurable to correlate rotational position of the blades of the tool to a roll gap based on geometry and mathematical principles as will be understood by those of ordinary skill in the art in view of the teaching herein. In view of the teachings herein, those of ordinary skill in the art will understand this and other suitable ways to power the tool.

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:

1. A device for measuring a gap distance between two or more offset rollers of a leveling unit configured to level a sheet of steel or other material, the device comprising:
   (a) a shaft extending between a proximal end and a distal end of the shaft;
   (b) a sensing assembly connected with the shaft, the sensing assembly including a first blade having an arcuate surface matching a shape of one of the rollers such that the first blade is configured to contact the roller along a surface area rather than a tangent line or point, wherein at least a portion of the sensing assembly is rotatable about a pivot point;
   (c) an encoder in communication with the sensing assembly and configured to determine a rotational position of the sensing assembly and correlate the rotational position to the gap distance; and
   (d) a display configured to present a select one or more of an amount of rotation of the sensing assembly and the gap distance.

2. The device of claim 1, wherein the display comprises a digital readout configured to present the gap distance measured by the device.

3. The device of claim 1, comprising a pipe hub, wherein the encoder is located within the pipe hub.

4. The device of claim 1, wherein the sensing assembly comprises a scissors-type configuration with a pair of pivoting blades.

5. The device of claim 1, wherein the sensing assembly comprises a pair of blades, wherein at least one of the blades is rotatable relative to the other.

6. The device of claim 5, wherein a second blade of the pair of blades includes a flat surface configured for tangential contact with one of the rollers of the leveling unit.

7. The device of claim 1, further comprising a level configured to inform a user of the orientation of the device during use.

8. The device of claim 7, wherein the level is located on a proximal end of the device.

9. The device of claim 1, wherein the sensing assembly comprises a biasing feature configured to return a pair of blades of the sensing assembly to an initial position.

10. The device of claim 9, wherein the biasing feature is configured to move in response to the rotation of the one or more of the blades.

\* \* \* \* \*